United States Patent [19]
Schauer et al.

[11] Patent Number: 5,586,381
[45] Date of Patent: Dec. 24, 1996

[54] METHOD FOR THE PRODUCTION OF A DEVICE FOR THE TRANSMISSION OF A SIGNAL BETWEEN TWO END POINTS

[75] Inventors: Friedrich Schauer, Heroldsberg; Andreas Neuner, Nürnberg, both of Germany

[73] Assignee: kabelmetal electro GmbH, Hanover, Germany

[21] Appl. No.: 562,551

[22] Filed: Nov. 24, 1995

Related U.S. Application Data

[63] Continuation of Ser. No. 223,779, Apr. 6, 1994, abandoned.

[30] Foreign Application Priority Data

May 4, 1993 [DE] Germany .................. 43 14 648.1

[51] Int. Cl.$^6$ .................................................. B23P 11/00
[52] U.S. Cl. ........................... 29/434; 29/527.1; 264/242; 439/15
[58] Field of Search .................. 29/434, 463, 469, 29/527.1, 876, 877, 881, 882, 883; 425/542, 588; 439/15, 34, 13; 264/242, 250, 259, 328.11

[56] References Cited

U.S. PATENT DOCUMENTS

| | | | |
|---|---|---|---|
| 4,607,898 | 8/1986 | Reighard et al. | 439/15 |
| 4,722,690 | 2/1988 | Priede | 439/15 |
| 4,744,763 | 5/1988 | Suzuki et al. | 439/15 |
| 5,009,604 | 4/1991 | Plocek et al. | 439/15 |
| 5,013,505 | 5/1991 | Masuda | 264/242 |
| 5,013,511 | 5/1991 | Akashi | 264/242 |

FOREIGN PATENT DOCUMENTS

| | | |
|---|---|---|
| 0282392 | 9/1988 | European Pat. Off. . |
| 0315979 | 5/1989 | European Pat. Off. . |
| 0417350 | 3/1991 | European Pat. Off. . |
| 2316060 | 1/1977 | France . |
| 4102383 | 8/1991 | Germany . |

*Primary Examiner*—David P. Bryant
*Attorney, Agent, or Firm*—Martin A. Farber

[57] ABSTRACT

A method is described for the production of a device for transmitting a signal between two end points, at least one of which is movable relative to the other, and between which a wound line which forms a coil and is contained in a substantially circular cassette is arranged. Further extending lines are connected to the line at the two end points. The cassette consists of two parts, namely a stator and a rotor which is turnable around its axis and around the stator. The two parts of the cassette are connected in secure manner to each other by injection molding, in such a way that the rotor is turnable around a common axis within the stator.

7 Claims, 2 Drawing Sheets

METHOD FOR THE PRODUCTION OF A DEVICE FOR THE TRANSMISSION OF A SIGNAL BETWEEN TWO END POINTS

RELATED APPLICATION

This application is a continuation of our application Ser. No. 08/223,779 filed Apr. 6, 1994, now abandoned.

FIELD AND BACKGROUND OF THE INVENTION

The present invention relates to a method for the production of a device for transmitting a signal between two end points at least one of which is movable relative to the other and between which a wound line which forms a coil and is contained in a substantially circular cassette is arranged. Further extending lines being connected to the line at the two end points, the cassette consisting of two parts, namely a stator and a rotor which rotates around its axis and around the stator (European patent EP-OS 0 417 350).

Such a device is required, for instance, for the transmitting of a signal in order to release the "airbag" of an anti-impact system for motor vehicles. It is arranged in the steering wheel of a vehicle for the transmission of an electrical or optical signal. A "line" within the meaning of the invention can therefore be an electrical line or an optical line. One basic problem with this device is the transmitting of signals between fixed and moving parts of the vehicle. The wiper contacts or wiper rings serving for the transmission of current which have been used for a long time in such cases are subject to wear and are disadvantageous, particularly in the case of low current intensities, due to varying contact resistance.

In the known device in accordance with the aforementioned EP-OS 0 417 350, electric current is used for the transmission of the signal. The current is transmitted over a ribbon cable which is wound into a coil, in the manner, for instance of a spring housing. Upon relative rotation of the two end points which are connected by the ribbon cable, the coiled ribbon cable "breathes" like the spring of a watch. The turns of the wound ribbon cable are contracted in the one direction of rotation to a smaller diameter. In the other direction of rotation, they return to a larger diameter. The ribbon cable can in this way participate in the turning movements of the steering wheel without the signal path being interrupted. For the production of the cassette, the individual parts, particularly its stator and rotor, are placed together. In this connection spring parts and other detent elements engage in recesses in the other part. They assure the holding together of all the parts of the cassette. The spring parts and detent elements are bent upon assembling of the individual parts of the cassette. They slide with a relatively high force of application along surfaces of the other parts. Damage to these surfaces can therefore not be avoided, particularly when tools are used for the assembling. In the case of this cassette, the rotor and stator are furthermore assembled with a relatively large amount of play. Upon the turning of the rotor, therefore, disturbing noises are produced because of the damaged, non-circular surfaces and the play between stator and rotor.

SUMMARY OF THE INVENTION

It is an object of the invention so further to develop the method described above that no disturbing noises are produced upon the turning of the rotor.

According to the invention, the two parts of the cassette (K) are so connected to each other in secure manner by injection molding that the one part is turnable around a common axis in the other part.

With this method, the rotor and stator of the cassette are already attached to each other by injection molding upon their manufacture. They therefore fit each other as precisely as possible. The travel surfaces, which are present between the two parts, enter into action upon the rotation of the rotor, and are exactly adapted to each other. Therefore, no disturbing noises occur upon the turning of the rotor. Since the rotor and stator need no longer be put together, no damage to the surfaces which might be caused thereby can take place any longer. This also contributes to the avoidance of noise upon the turning of the rotor. Furthermore, no spring parts or detent elements are required any longer, so that the cassette as a whole can be developed in a simpler manner.

According to a feature of the invention, both parts of the cassette (K) are produced by injection molding in the form of an annular disk (RI) having a cylindrical tube (RO) protruding on the one side, the inside diameter of which tube is equal to the inside diameter of a central opening in the annular disk (RI), and the axial height of which tube corresponds approximately to the height of the cassette (K).

Still further according to the invention first of all the first part (12) of the cassette (K) is produced with at least one circumferential projection (14) on the inner surface of its tube (RO2), thereupon the second part (11) of the cassette (K) is injection molded around the first part (12) in such a manner that its tube (RO1) lies within the tube (RO2) of the first part (12), and that the projection (14) of the tube RO2 engages in a circumferential depression (15) of the tube RO1, and finally the cable (10) is introduced into and coiled in the annular space (13) between the two parts (11, 12) of the cassette (K).

Furthermore according to the invention, both parts (11, 12) of the cassette (K) are produced in swingable molds (one mold can be swung away from a second mold) of the same injection molding apparatus, the single operation arising by developing a mold for the rotor (12) in the mold for the stator (11).

Still further, different materials can be used for the two parts (11, 12) of the cassette (K), such as a plastic material of a lower melting point and a plastic material of a higher melting point.

Also, the invention provides that a material having a lower melting point than the first part (12) is used for the part of the cassette (K) which is injection molded as second part (11).

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

The invention will be described below with reference to a cassette within which a ribbon cable having electric conductors is arranged. Instead of the ribbon cable, however, a cable having at least one light guide could also be used. A combined cable with electrical wires and optical guides could also be used. In the following, a ribbon cable with electric conductors is taken as basis representative of all other possibilities.

Figure 1:
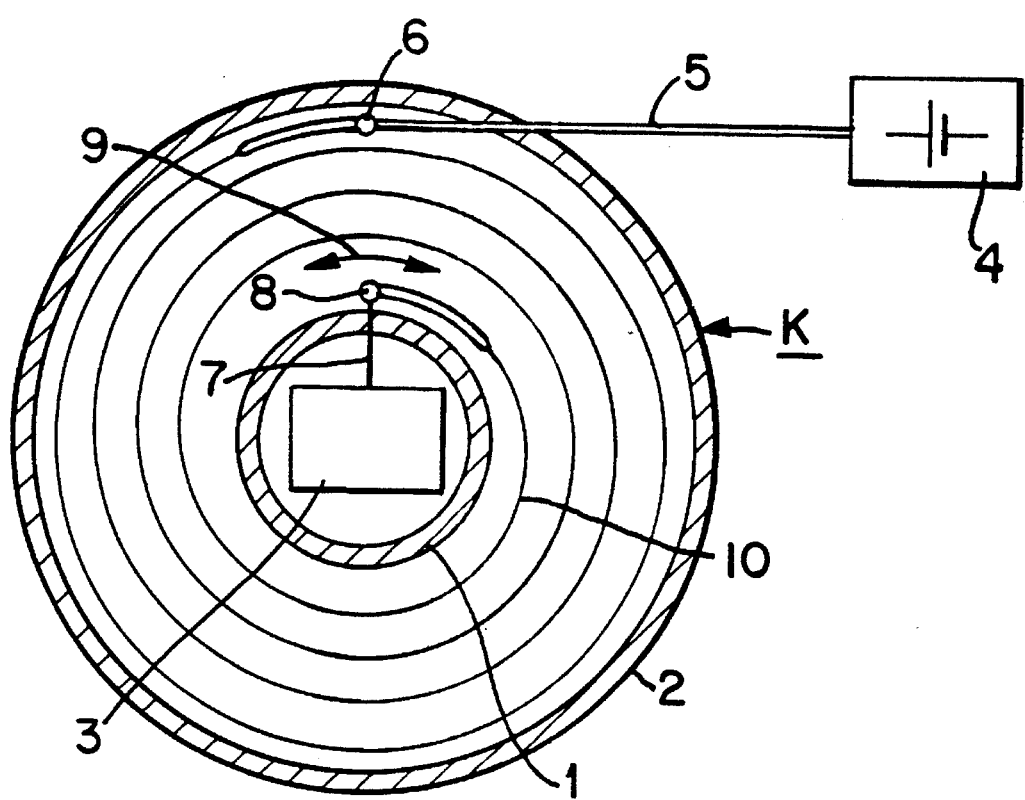
FIG. 1 is a view of a cassette for the signal transmission, shown diagrammatically.

FIG. 1 shows diagrammatically two walls 1 and 2 of a cassette K, which are for instance of circular shape. The cassette is intended for installation in the steering wheel of a motor vehicle. For the supplying of current to an electronic unit 3 by the signal of which an airbag can be released, electrical conductors of the cassette K are connected to the battery 4 of the vehicle. The battery 4 is connected by an electric cable 5 to one end point 6 of the cassette K which point is developed as fixed point. The electronic unit 3 is connected by an electric wire 7 to an end point 8 of the cassette K, which point is movable in the direction indicated by the double-ended arrow 9. In principle, the end point 8 could also be stationary and the end point 6 movable. Both end points 6 and 8 could also be movable.

Between the two end points 6 and 8 there is arranged a ribbon cable 10 containing at least two electric wires. The wires are preferably developed as flat wires. This embodiment of the ribbon cable 10 is particularly thin and therefore takes up little space. In principle, the ribbon cable 10, however, could also have round wires. The construction of the ribbon cable 10 and the manner of its connection to the end points 6 and 8 is not shown in detail. It is known basically in various embodiments and need be described in detail.

In accordance with FIG. 1, the ribbon cable 10 is arranged in the cassette K in several turns between the two end points 6 and 8, namely in the manner of a spring housing of a watch. Although the number of turns of a steering wheel is limited to about six, more than six turns should be provided for the ribbon cable 10. The turning of the end point 8 is not then substantially noticeable for a single turn of the ribbon cable 10. The diameter of the coil which consists of all turns of the ribbon cable 10 is merely made smaller or larger.

Figure 2:
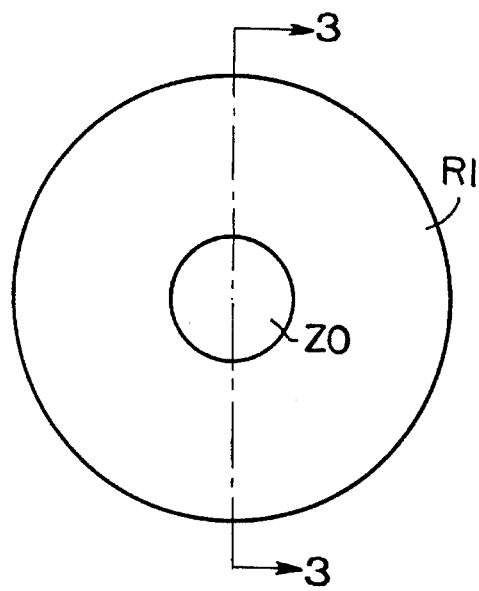
FIG. 2 shows an individual part of the cassette.
Figure 3:
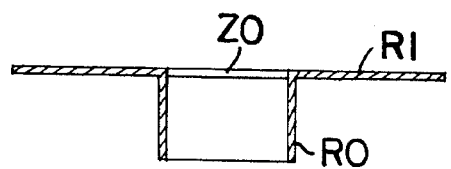
FIG. 3 is a section through FIG. 2 along the line 3—3.
Figure 4:
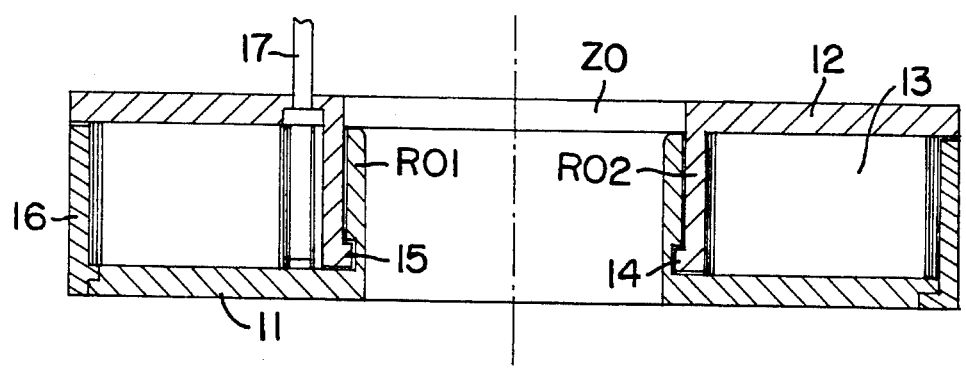
FIG. 4 shows the assembled cassette in a sectional view on a larger scale.

As shown in FIG. 4, the cassette K consists essentially of two parts, namely a stator 11 and a rotor 12. As can be noted from FIGS. 2 and 3, both parts are developed as an annular disk RI with a tube RO protruding from one side. In the assembled condition shown in FIG. 4, they enclose an annular space 13 which serves to receive the coiled ribbon cable 10. The tube RO has an inside diameter which is equal to the central opening ZO of the annular disk RI. Its axial height corresponds approximately to the axial height of the annular space 13 of the cassette K.

The two parts of the cassette K, namely stator 11 and rotor 12, are thus basically of the same construction. They consist of annular disk RI and tube RO. The diameters of the tubes RO differ so that they can engage in each other, as shown in FIG. 4. The one part of the cassette K, preferably the rotor 12, has a circumferential projection 14 on the outer surface of its tube RO2, as can be noted from FIG. 4. The other part of the cassette K, which is preferably the stator 11, has, as shown in FIG. 4, a circumferential depression or groove 15 which corresponds to the projection 14 on the outer surface of its tube RO2. In the finished cassette K the projection 14 engages into the depression 15 so that rotor 12 and stator 11 are connected to each other. The rotor 12 is turnable within the stator 11 since the two tubes RO1 and RO2 are separated from each other by a narrow air gap. Projection 14 and depression 15 act as bearing surfaces upon the turning of the rotor 12.

At least one circumferential projection 14 with corresponding depression 15 are to be arranged on the tubes RO2 and RO1. However, two or more projections and depressions may also be present, axially one above the other. It is best, however, if the projection 14, as shown in FIG. 4, is arranged on the free end of the tube RO2. The injection mold for the production of a part developed in this manner is then particularly simple without slide, and the part consisting of annular disk RI and tube RO2 can easily be removed from the mold without the danger of damaging it.

The projection 14 can, in principle, also be arranged alternatively on the tube RO1 of the stator 11. The depression 15 would then be located on the tube RO2 of the rotor 12. The two parts may consist of the same material, for instance polycarbonate, polyamide or polyoxymethylene. However, different materials having in particular different melting points are preferably used.

The cassette K shown in FIG. 4 is produced as follows:

The first part of the cassette K—in this case the rotor 12—is produced first of all by injection molding in one mold of an injection molding machine. As soon as the material of the rotor 12 is sufficiently firm, it is introduced into a second mold in which the second part of the cassette—in this case therefore the stator 11—is molded around the rotor 12. The tube RO1 of the stator 11 then lies within the tube RO2 of the rotor 12. Its circumferential depression 15 surrounds the projection 14 of the tube RO2. After the cooling of the injected materials, the tubes RO1 and RO2 are spaced from each other by a narrow air gap. The rotor 12 can then turn easily and silently within the stator 11.

In order to establish the air gap between the tubes RO1 and RO2, the shrinkage of the injected materials upon cooling is employed. As already mentioned, different materials are preferably used for rotor 12 and stator 11. The material of the later molded stator 11 preferably has a lower melting point than the material of the rotor 12.

The same injection molding machine can be used for the molding of rotor 12 and stator 11. It has two different molds. The mold for the rotor 12 can be developed in the mold for the stator 11. The cassette K which consists of stator 11 and rotor 12 is then produced in one operation.

After removal of the part consisting of rotor 12 and stator 11 from the mold, the coiled ribbon cable 10 can be introduced into the annular space 13 in the cassette K. The cassette K can then be closed by a cover 16 having the configuration of a cylinderical wall. At one end of the ribbon cable 10 a further-extending line 17 extends out of the cassette K. The other further-extending line arranged at the other end of the ribbon cable 10 has not been shown in FIG. 4.

We claim:

1. A method for making a device comprising a substantially circular cassette for transmitting a signal between two end points at least one of which is movable relative to the other, wherein the device is adapted to hold a wound cable which forms a coil between the two end points, wherein extending lines are connected to the cable at the two end points, and wherein the cassette comprises two parts, a first of said parts being a stator, and a second of said parts being a rotor which rotates around an axis and around the stator, the method comprising the steps of:

injection molding said first cassette part using a first mold, said first cassette part comprising a first annular disk with a first cylindrical tube extending concentrically from said firs disk;

providing a second mold comprising said first cassette part, and a further mold part extending into said first tube of said first cassette part;

injection molding said second cassette part using said second mold, said second cassette part comprising a second annular disk with a second cylindrical tube extending concentrically from said second disk, said second tube, while in said second mold, being disposed between said further mold part and said first tube; and cooling said second tube to obtain a shrinking of said second tube away from said first tube to produce a gap between said first and said second tubes, said gap allowing said cassette parts to rotate relative to each other around a common axis of said two cassette parts.

2. The method according to claim 1, wherein, in said injection molding steps, each of said first and second cassette parts is formed such that the tube has an inside diameter equal to an inside diameter of a central opening in the annular disk, and an axial height approximately equal to a height of said cassette.

3. The method according to claim 2, wherein, in said injection molding steps, said first cassette part is formed with a circumferential projection on an inner surface of said first tube and said second cassette part is formed with a circumferential depression on an outer surface of said second tube which receives said circumferential projection of said first cassette part; and said method further comprises introducing a cable into said cassette in an annular space between said annular disks and exterior to the tubes of said two cassette parts.

4. The method according to claim 3, further comprising closing said annular space with a cover.

5. The method according to claim 2, wherein, said first and said second molds constitute a swingable mold of a common injection molding apparatus.

6. The method according to claim 2, wherein said first cassette part is formed from a first material, and said second cassette part is formed from a second material different from said first material.

7. The method according to claim 6, wherein said first material has a higher melting point than said second material.

* * * * *